(12) United States Patent
Quan et al.

(10) Patent No.: US 10,098,157 B2
(45) Date of Patent: Oct. 9, 2018

(54) RANDOM ACCESS APPARATUS AND METHOD

(71) Applicant: Huawei Technologies Co., Ltd., Shenzhen, Guangdong (CN)

(72) Inventors: Wei Quan, Beijing (CN); Bingzhao Li, Beijing (CN); Xiaodong Yang, Beijing (CN); Zhenxing Hu, Shenzhen (CN); Jian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 165 days.

(21) Appl. No.: 15/338,041

(22) Filed: Oct. 28, 2016

(65) Prior Publication Data

US 2017/0048891 A1 Feb. 16, 2017

Related U.S. Application Data

(63) Continuation of application No. PCT/CN2014/076450, filed on Apr. 29, 2014.

(51) Int. Cl.
*H04W 74/08* (2009.01)
*H04W 48/16* (2009.01)
(Continued)

(52) U.S. Cl.
CPC ....... *H04W 74/0833* (2013.01); *H04W 48/16* (2013.01); *H04W 74/004* (2013.01); *H04W 88/02* (2013.01)

(58) Field of Classification Search
CPC ............. H04W 74/0833; H04W 48/16; H04W 74/004; H04W 88/02
See application file for complete search history.

(56) References Cited

U.S. PATENT DOCUMENTS

2004/0240525 A1 12/2004 Karabinis et al.
2008/0056193 A1* 3/2008 Bourlas ............ H04W 74/0875
370/331
(Continued)

FOREIGN PATENT DOCUMENTS

CN 101547440 A 9/2009
CN 103493576 A 1/2014
(Continued)

OTHER PUBLICATIONS

Qualcomm, Ericsson, "Introducing LTE in Unlicensed Spectrum", 3GPP RAN #62, Dec. 3-7, 2013, 8 pages, RP-131635.
(Continued)

*Primary Examiner* — Ajay Cattungal

(57) ABSTRACT

Embodiments of the present invention provide random access user equipment, including: a receiving module, configured to receive a notification message sent by a base station, where the notification message is used to instruct the user equipment UE to execute a random access procedure; a processing module, configured to determine, according to a configuration parameter in the notification message received by the receiving module, a PRACH resource used to execute the random access procedure; and a sending module, configured to send a random access code to the base station on the PRACH resource determined by the processing module; where the receiving module is configured to receive a random access response message sent by the base station. The embodiments of the present invention further provide a random access method. The present invention has an advantage that executing the random access procedure on an unlicensed spectrum can be implemented.

18 Claims, 4 Drawing Sheets

(51) Int. Cl.
*H04W 74/00* (2009.01)
*H04W 88/02* (2009.01)

(56) References Cited

U.S. PATENT DOCUMENTS

| | | | |
|---|---|---|---|
| 2008/0069041 A1 | 3/2008 | Tandai et al. | |
| 2008/0214193 A1* | 9/2008 | Jeong | H04W 74/004 455/436 |
| 2008/0232343 A1* | 9/2008 | Nguyen | H04L 27/2657 370/347 |
| 2009/0190566 A1 | 7/2009 | Kwon et al. | |
| 2009/0221288 A1* | 9/2009 | Zhang | H04B 7/2606 455/434 |
| 2011/0103342 A1* | 5/2011 | Cho | H04W 28/20 370/329 |
| 2011/0286420 A1* | 11/2011 | Cho | H04W 74/004 370/329 |
| 2011/0319066 A1* | 12/2011 | Chou | H04W 36/0077 455/422.1 |
| 2012/0063305 A1* | 3/2012 | Chiu | H04W 74/0833 370/230 |
| 2013/0301591 A1 | 11/2013 | Meyer et al. | |
| 2014/0029595 A1 | 1/2014 | Tsuboi et al. | |
| 2014/0031054 A1 | 1/2014 | Zou et al. | |
| 2014/0092801 A1* | 4/2014 | Kim | H04L 12/1877 370/312 |
| 2014/0194124 A1* | 7/2014 | Xiao | H04W 36/0061 455/437 |

FOREIGN PATENT DOCUMENTS

| | | |
|---|---|---|
| CN | 103580840 A | 2/2014 |
| CN | 103596288 A | 2/2014 |
| KR | 10-2009-0083760 | 8/2009 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.1.0, Mar. 2014, 57 pages.

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.1.0, Mar. 2014, 356 pages.

* cited by examiner

RANDOM ACCESS APPARATUS AND METHOD

CROSS-REFERENCE TO RELATED APPLICATIONS

This application is a continuation of International Patent Application No. PCT/CN2014/076450, filed on Apr. 29, 2014, the disclosure of which is hereby incorporated by reference in its entirety.

TECHNICAL FIELD

The present invention relates to the field of communications technologies, and in particular, to a random access apparatus and method.

BACKGROUND

A spectrum is a basis of wireless communication. Spectrum resources include a licensed spectrum resource and an unlicensed spectrum resource. Currently, a main technology that uses the unlicensed spectrum resource is wireless fidelity (WiFi). However, the WiFi has disadvantages in terms of mobility, security, quality of service (QoS), and concurrent processing of multi-user scheduling. Therefore, applying an unlicensed spectrum to a Long Term Evolution (LTE) device can not only result in effective use of the unlicensed spectrum resource, but also provide more effective wireless access and meet a growing demand for mobile broadband service. Therefore, in a future mobile communications scenario, both an LTE base station device and a WiFi device exist on the unlicensed spectrum. One of feasible solutions of using the unlicensed spectrum by the LTE base station is that the unlicensed spectrum is used as a secondary cell (Scell) of LTE user equipment (UE) and is configured for the UE, so that the LTE base station can perform data communication with the UE by using the unlicensed spectrum.

In an LTE system and in an LTE Advanced (LTE-A) system, a random access procedure is required when data transmission is performed for using a licensed spectrum. Random access procedures are classified into a non-contention based random access procedure and a contention-based random access procedure. Random access parameters used in a random access procedure of the prior art, such as a physical random access channel resource and a parameter related to random access, are notified to UE mainly by using system broadcast information; for example, information such as a subframe or frequency channel number with the physical random access channel (PRACH) resource, a random access code set, a random access code group, a maximum quantity of sending times of a random access code, and a size of a random access response message receiving window is notified to the UE. When the UE executes a contention-based random access procedure, the UE selects a random access code according to the random access parameters in the system message, and sends the selected random access code on a selected random access channel. When the UE executes a non-contention based random access procedure, the UE determines the random access channel based on the random access parameters in the system message and a random access channel mask sequence number notified by a base station by using a physical downlink control channel (PDCCH) command, and sends, on the determined random access channel, the random access code notified by using the PDCCH command to the base station. After sending the random access code, the UE receives a random access response message in the random access response message receiving window in the random access parameters notified by the base station by using the system broadcast message.

Currently, a random access procedure is also required when data transmission is performed for using an unlicensed spectrum. However, because a contention and a collision may exist on an unlicensed spectrum resource, that is, the unlicensed spectrum resource may be sometimes available or sometimes unavailable. Therefore, if a PRACH resource on the unlicensed spectrum is also notified by using system broadcast information, it may occur that a subframe of the configured PRACH resource is unavailable, while an available subframe is not provided with the PRACH resource, and consequently the random access procedure cannot be executed on the unlicensed spectrum.

SUMMARY

Embodiments of the present invention provide a random access apparatus and method, which can implement that a random access procedure is executed on an unlicensed spectrum.

A first aspect of the embodiments of the present invention provides random access user equipment, and the user equipment may include:

a receiving module, configured to receive a notification message sent by a base station, where the notification message is used to instruct the user equipment UE to execute a random access procedure, and the notification message carries at least one of the following configuration parameters: a random access code used by the UE to execute the random access procedure, or information about a physical random access channel PRACH resource that is configured on an unlicensed spectrum and that is used by the UE to execute the random access procedure;

a processing module, configured to determine, according to the configuration parameter in the notification message received by the receiving module, a PRACH resource used to execute the random access procedure; and a sending module, configured to send the random access code to the base station on the PRACH resource determined by the processing module; where the receiving module is configured to receive a random access response message sent by the base station, and determine, according to the random access response message, that the random access procedure is successfully completed.

With reference to the first aspect, in a first possible implementation manner, the notification message received by the receiving module may be specifically a radio resource control RRC message, a media access control MAC message, or a physical layer PHY message.

With reference to the first aspect, in a second possible implementation manner, the random access code that is used by the UE to execute the random access procedure and that is carried in the notification message received by the receiving module is specifically a dedicated random access code, or information used to instruct the UE to randomly select a random access code.

With reference to the first aspect, in a third possible implementation manner, the information that is about the PRACH resource and that is carried in the notification message received by the receiving module includes a frequency domain location of the PRACH resource or a time domain location of the PRACH resource, where the PRACH resource is configured on the unlicensed spectrum and is used by the UE to execute the random access procedure.

With reference to any one of the first aspect to the third possible implementation manner of the first aspect, in a fourth possible implementation manner, when determining, according to the configuration parameter in the notification message, the PRACH resource used to execute the random access procedure, the processing module is specifically configured to:

determine, according to the information that is about the PRACH resource and that is in the notification message, a location of the PRACH resource used to execute the random access procedure; and the sending module is configured to send, at the determined location of the PRACH resource, the random access code carried in the notification message to the base station.

With reference to any one of the first aspect to the third possible implementation manner of the first aspect, in a fifth possible implementation manner, the notification message received by the receiving module further includes at least one of: a listening parameter that is used to listen on the unlicensed spectrum before the UE sends the random access code to the base station, or a validity time for sending the random access code by the UE, where the listening parameter includes at least one of a listening time, a backoff time, a power threshold, or an energy threshold.

With reference to the fifth possible implementation manner of the first aspect, in a sixth possible implementation manner, the processing module is further configured to:

listen to, according to the listening parameter, whether the determined PRACH resource configured on the unlicensed spectrum is idle, or listen to, according to the listening parameter, whether the determined unlicensed spectrum is idle; and if it is detected, by means of listening, that the PRACH resource is idle or the unlicensed spectrum is idle, instruct the sending module to send the random access code to the base station on the PRACH resource during the validity time for sending the random access code, or instruct the sending module to send the random access code to the base station on the PRACH resource during the validity time for sending the random access code and after backoff is randomly performed for a specified time according to the backoff time.

With reference to the fourth possible implementation manner of the first aspect or the sixth possible implementation manner of the first aspect, in a seventh possible implementation manner, the receiving module is specifically configured to:

determine a value of a random access radio network temporary identifier RA-RNTI according to protocol pre-configuration or a time domain location and a frequency domain location that are of the PRACH resource; and decode, by using the RA-RNTI in a random access response receiving window, a scheduling command corresponding to the random access response message, and decode the random access response message according to the scheduling command.

With reference to the seventh possible implementation manner of the first aspect, in an eighth possible implementation manner, a start location of the random access response receiving window is specifically an $N^{th}$ subframe after the UE sends the random access code; or a start location of the random access response receiving window is specifically an $N^{th}$ subframe after the specified validity time; where N is a non-zero natural number.

A second aspect of the embodiments of the present invention provides a random access method, and the method may include:

receiving, by user equipment UE, a notification message sent by a base station, where the notification message is used to instruct the UE to execute a random access procedure, and the notification message carries at least one of the following configuration parameters: a random access code used by the UE to execute the random access procedure, or information about a physical random access channel PRACH resource that is configured on an unlicensed spectrum and that is used by the UE to execute the random access procedure;

determining, by the UE according to the configuration parameter in the notification message, a PRACH resource used to execute the random access procedure, and sending the random access code to the base station on the PRACH resource; and receiving, by the UE, a random access response message sent by the base station, and determining, according to the random access response message, that the random access procedure is successfully completed.

With reference to the second aspect, in a first possible implementation manner, the notification message may be specifically a radio resource control RRC message, a media access control MAC message, or a physical layer PHY message.

With reference to the second aspect, in a second possible implementation manner, the random access code used by the UE to execute the random access procedure is specifically a dedicated random access code, or information used to instruct the UE to randomly select a random access code.

With reference to the second aspect, in a third possible implementation manner, the information about the PRACH resource that is configured on the unlicensed spectrum and that is used by the UE to execute the random access procedure includes a frequency domain location of the PRACH resource or a time domain location of the PRACH resource.

With reference to any one of the second aspect to the third possible implementation manner of the second aspect, in a fourth possible implementation manner, the determining, by the UE according to the configuration parameter in the notification message, a PRACH resource used to execute the random access procedure, and sending the random access code to the base station on the PRACH resource includes:

determining, by the UE according to the information that is about the PRACH resource and that is in the notification message, a location of the PRACH resource used to execute the random access procedure, and sending, at the determined location of the PRACH resource, the random access code carried in the notification message to the base station.

With reference to any one of the second aspect to the third possible implementation manner of the second aspect, in a fifth possible implementation manner, the notification message further includes at least one of: a listening parameter that is used to listen on the unlicensed spectrum before the UE sends the random access code to the base station, or a validity time for sending the random access code by the UE, where the listening parameter includes at least one of a listening time, a backoff time, a power threshold, or an energy threshold.

With reference to the fifth possible implementation manner of the second aspect, in a sixth possible implementation manner, before the sending the random access code to the base station on the PRACH resource, the method further includes:

listening to, by the UE according to the listening parameter, whether the determined PRACH resource configured on the unlicensed spectrum is idle, or listening to, by the UE according to the listening parameter, whether the determined unlicensed spectrum is idle; and if it is detected, by means of listening, that the PRACH resource is idle or the unlicensed spectrum is idle, sending the random access code to the base station on the PRACH resource during the validity time for sending the random access code, or sending the random access code to the base station on the PRACH resource during the validity time for sending the random access code and after backoff is randomly performed for a specified time according to the backoff time.

With reference to the fourth possible implementation manner of the second aspect or the sixth possible implementation manner of the second aspect, in a seventh possible implementation manner, the receiving, by the UE, a random access response message sent by the base station includes:

determining, by the UE, a value of a random access radio network temporary identifier RA-RNTI according to protocol pre-configuration or a time domain location and a frequency domain location that are of the PRACH resource; and decoding, by the UE by using the RA-RNTI in a random access response receiving window, a scheduling command corresponding to the random access response message, and decoding the random access response message according to the scheduling command.

With reference to the seventh possible implementation manner of the second aspect, in an eighth possible implementation manner, a start location of the random access response receiving window is specifically an $N^{th}$ subframe after the UE sends the random access code; or a start location of the random access response receiving window is specifically an $N^{th}$ subframe after the specified validity time; where N is a non-zero natural number.

In the embodiments of the present invention, user equipment may determine, according to a notification message sent by a base station, a PRACH resource that is configured on an unlicensed spectrum and that is used to execute a random access procedure, send a random access code to the base station on the determined PRACH resource, and further receive, in a random access response receiving window configured by the base station, a random access response message sent by the base station, which can reduce a delay of implementing the random access procedure on the unlicensed spectrum, and reduce a probability of a collision during implementation of the random access procedure on the unlicensed spectrum, thereby implementing that the random access procedure is better executed on the unlicensed spectrum, and enhancing user experience of implementing the random access procedure on the unlicensed spectrum.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In specific implementation, to better describe a specific implementation process of implementing a random access procedure on an unlicensed spectrum, the following briefly describes a process of implementing random access on a licensed spectrum in the prior art.

Figure 1:
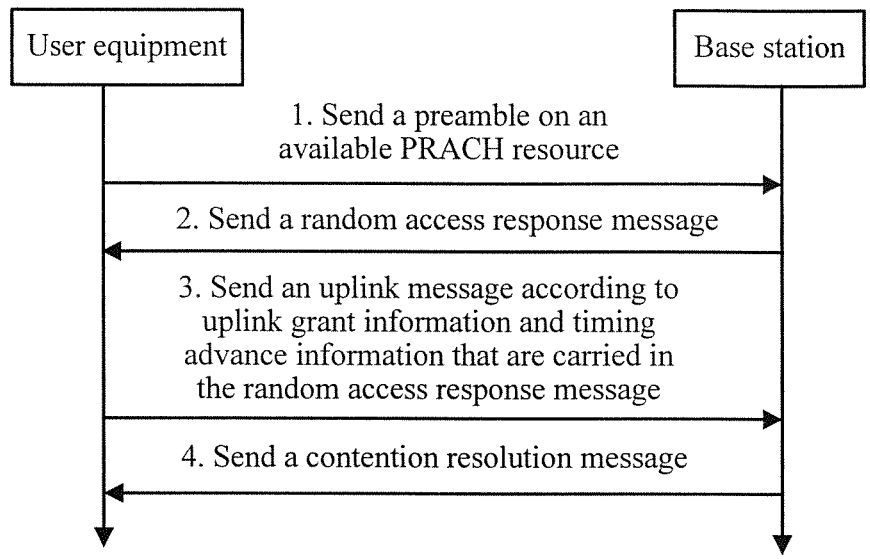
FIG. 1 is a schematic interaction diagram of a contention-based random access procedure in implementing a random access procedure on a licensed spectrum in the prior art.

In the prior art, implementing the random access procedure on the licensed spectrum may be classified into a non-contention based random access procedure and a contention-based random access procedure. Referring to FIG. 1, FIG. 1 is a schematic interaction diagram of the contention-based random access procedure in implementing the random access procedure on the licensed spectrum in the prior art, including:

Step 1: UE sends a preamble to a base station on an available PRACH resource.

In the prior art, in the contention-based random access procedure, the UE randomly selects a preamble, and sends the preamble to the base station on the available PRACH resource. The foregoing preamble and the available PRACH resource are notified to the UE by the base station by using a system broadcast message. On the licensed spectrum, because a PRACH resource is a resource on the licensed spectrum, neither contention nor collision exists. Therefore, the PRACH resource notified to the UE by the base station by using the system broadcast message is the available PRACH resource, and the UE may directly send information such as the preamble to the base station on the available PRACH resource notified by the foregoing base station.

Step 2: The base station sends a random access response message to the UE.

After receiving the preamble sent by the UE, the base station may send the random access response message to the UE. The random access response message carries uplink grant information and UE uplink timing advance information.

Step 3: The UE sends uplink information according to uplink grant information and timing advance information that are carried in the random access response message.

After receiving the random access response message sent by the base station, the UE may send the uplink information to the base station according to the uplink grant information and the timing advance information that are carried in the random access response message. The forgoing uplink information includes content that can identify the UE. That is, the base station may identify the UE according to the uplink information sent by the UE, and may further send a contention resolution message to the UE.

Step 4: The base station sends a contention resolution message to the UE.

After the base station sends the contention resolution message to the UE, the UE may determine, according to the received contention resolution message, whether the random access procedure is successfully completed. If it is learned, by means of determining, that the random access procedure is successfully completed, the UE may execute subsequent data receiving and sending procedures.

It may be learned from the foregoing that, in the prior art, when UE executes a contention-based random access procedure, the UE selects a random access code according to a random access parameter notified in a system broadcast message, and sends the selected random access code on a selected random access channel.

Figure 2:
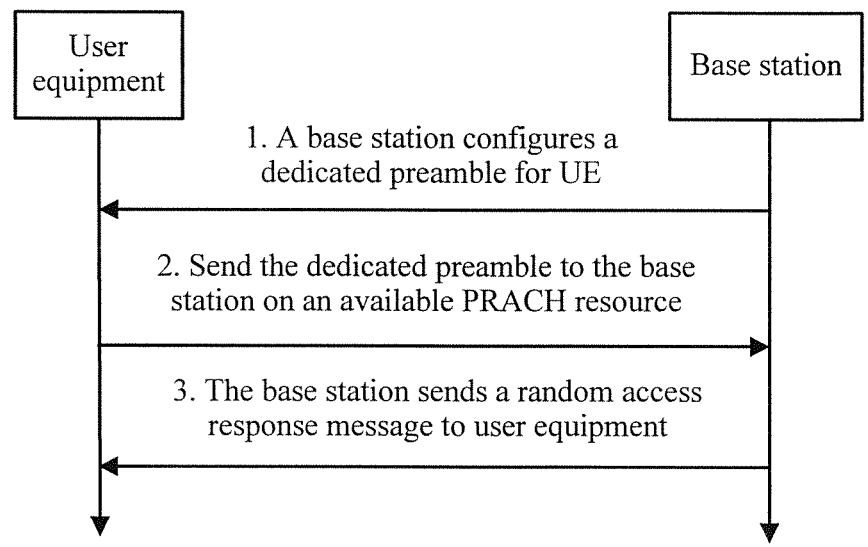
FIG. 2 is a schematic interaction diagram of anon-contention based random access procedure in implementing a random access procedure on a licensed spectrum in the prior art.

Referring to FIG. 2, FIG. 2 is a schematic interaction diagram of a non-contention based random access procedure in implementing a random access procedure on a licensed spectrum in the prior art, including:

Step 1: A base station configures a dedicated preamble for UE.

In the prior art, in the non-contention based random access procedure, the base station first configures a dedicated preamble for the UE. Optionally, the base station may further configure, for the UE, a PRACH resource for sending the preamble, and the UE may send information such as the preamble to the base station according to the preamble and the PRACH resource that are configured by the base station.

Step 2: The UE sends the dedicated preamble to the base station on an available PRACH resource.

In the prior art, because the random access procedure is performed on the licensed spectrum, neither contention nor collision exists. Therefore, the base station may configure the available PRACH resource for the UE, and after receiving the preamble and the PRACH resource that are configured by the base station, the UE may send the dedicated preamble to the base station on the available PRACH resource.

Step 3: The base station sends a random access response message to the user equipment.

After receiving the preamble sent by the UE, the base station sends the random access response message to the UE, where the foregoing random access response message carries uplink grant information and UE uplink timing advance information. After receiving the random access response message sent by the base station, the UE may consider that the random access procedure is successfully completed, and may further execute subsequent data receiving and sending procedures.

It may be learned from the foregoing that, in the prior art, in a non-contention based random access procedure, UE sends a dedicated preamble to a base station on an available PRACH resource according to the preamble and the available PRACH resource that are notified in a system broadcast message, receives, in a random access response message receiving window sent in the system broadcast message, a random access response message sent by the base station, and completes the random access procedure.

In the prior art, because the random access procedure is performed on a licensed spectrum, neither contention nor collision exists in a spectrum resource. Therefore, the base station may obtain the available PRACH resource, and may further notify the UE of the available PRACH resource by using the system broadcast message, and the UE may directly send information such as the preamble to the base station on the PRACH resource notified by the base station.

A random access procedure described in the embodiments of the present invention is a random access procedure implemented on an unlicensed spectrum. Because a contention or a collision may exist on a resource on the unlicensed spectrum, that is, the unlicensed spectrum resource may be sometimes available or sometimes unavailable. If a base station sends resource information to UE by using a system broadcast message, it may be that the resource is available when the base station sends the resource information to the UE, but when the UE receives the system broadcast message sent by the base station, the resource information is occupied, that is, the resource is unavailable when the UE executes the random access procedure. Therefore, in the embodiments of the present invention, the base station cannot notify the UE of information about the available resource by using the system broadcast message. If a PRACH resource on the unlicensed spectrum is notified to the UE by using a method of the system broadcast message, it may occur that a subframe of the configured PRACH resource is unavailable, while an available subframe is not provided with the PRACH resource, so that the UE cannot execute the random access procedure on the unlicensed spectrum. To resolve the foregoing technical problem, the embodiments of the present invention provide a random access method. The UE may learn a configuration parameter of random access in real time from a notification message sent by the base station, and the UE may select the PRACH resource according to the configuration parameter carried in the notification message, and send information to the base station.

Figure 3:
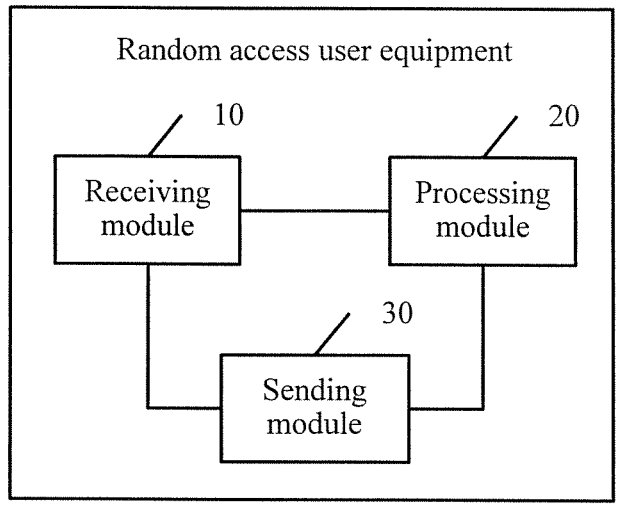
FIG. 3 is a schematic structural diagram of a first embodiment of random access user equipment according to an embodiment of the present invention.

Referring to FIG. 3, FIG. 3 is a schematic structural diagram of a first embodiment of random access user equipment according to an embodiment of the present invention. The user equipment described in this embodiment includes:

a receiving module 10, configured to receive a notification message sent by a base station, where the notification message is used to instruct the user equipment UE to execute a random access procedure, and the notification message carries at least one of the following configuration parameters: a random access code used by the UE to execute the random access procedure, or information about a physical random access channel PRACH resource that is configured on an unlicensed spectrum and that is used by the UE to execute the random access procedure;

a processing module 20, configured to determine, according to the configuration parameter in the notification message received by the receiving module, a PRACH resource used to execute the random access procedure; and a sending module 30, configured to send the random access code to the base station on the PRACH resource determined by the processing module; where the receiving module 10 is configured to receive a random access response message sent by the base station, and determine, according to the random access response message, that the random access procedure is successfully completed.

In specific implementation, because a contention and a collision may exist on an unlicensed spectrum resource, before instructing the UE to execute the random access procedure, the base station cannot determine a location of the specific available PRACH resource when the UE executes the random access procedure. Therefore, the base station cannot send the available PRACH resource to the UE by using system broadcast information, and the base station can instruct, only when the UE is required to execute the random access procedure and by using the notification message, the UE to execute the random access procedure and notify the UE of the available PRACH resource by using the notification message.

In some feasible implementation manners, when the UE is required by the base station to execute the random access procedure on the unlicensed spectrum, the base station may instruct, by sending the notification message to the UE, the UE to execute the random access procedure, and the UE may receive, by using the receiving module 10, the notification message sent by the base station. Specifically, the notification message received by the foregoing receiving module 10 may carry the random access code used by the UE to execute the random access procedure and the information about the PRACH resource that is configured on the unlicensed spectrum and that is used by the UE to execute the random access procedure. In specific implementation, the foregoing notification message may be specifically an RRC message, an MAC message, or a PHY message. Specifically, the random access code carried in the foregoing notification message may be a dedicated random access code, or may be information used to instruct the UE to randomly select a random access code. The information about the PRACH resource that is configured on the unlicensed spectrum and that is used by the foregoing UE to execute the random access procedure may include a frequency domain location of the foregoing PRACH resource, a time domain location of the foregoing PRACH resource, or the like, for example, a specific PRACH resource, or a subframe that is in a time domain and in which the PRACH resource exists. The foregoing time domain information may be an absolute frame number and an absolute subframe number, or a subframe offset (for example, a sixth subframe behind a subframe of the foregoing notification message) relative to the foregoing notification message. This embodiment of the present invention imposes no limitation on the frequency domain location or the time domain location of the PRACH resource. That is, when instructing, by sending the notification message to the UE, the UE to execute the random access procedure, the base station may notify the UE of an obtained specific location of the available PRACH resource, and may further send, to the UE, the random access code used by the UE to execute the random access. The UE may receive the foregoing notification message by using the receiving module 10, determine, by using the processing module 20 according to the PRACH resource notified in the notification message received by the foregoing receiving module 10, the PRACH resource used to execute the random access procedure, and may further send, by using the sending module 30, the random access code to the base station on the PRACH resource determined by the foregoing processing module 20.

In some feasible implementation manners, the notification message may be sent to the UE by using a cell operating on a licensed spectrum when the base station sends the notification message used to instruct to execute the random access procedure to the UE. Specifically, the notification message may be sent to the UE by using a primary cell, or be sent to the UE by using a secondary cell. The UE may obtain, by using the foregoing primary cell or secondary cell, the notification message sent by the base station, where the foregoing primary cell or secondary cell may be pre-configured in a protocol, or may be configured by using another message, which is not limited herein.

In some feasible implementation manners, after the receiving module 10 of the UE receives the notification message sent by the base station, the processing module 20 may determine, according to the configuration parameter carried in the notification message received by the receiving module 10, the PRACH resource used to execute the random access procedure. Specifically, the configuration parameter carried in the notification message received by the foregoing receiving module 10 may include the random access code used by the foregoing UE to execute the random access procedure, the PRACH resource used by the foregoing UE to execute the random access procedure, and the like; the PRACH resource carried in the foregoing notification message is the PRACH resource that is configured on the unlicensed spectrum and that is obtained by the base station, and is the available PRACH resource determined by the base station. However, because of an inconsistency between a location of the base station and a location of the UE, the UE may be in a moving state. Therefore, after the base station determines the available PRACH resource and notifies the UE of the available PRACH resource by using the notification message, if the UE is in the moving state, the PRACH resource sent by the foregoing base station may be unavailable in a current location of the UE when the UE executes the random access procedure according to the notification message sent by the base station; after the receiving module 10 of the UE receives the notification message sent by the base station and obtains the available PRACH resource, the processing module 20 further needs to determine a location of a specific to-be-used PRACH resource in the foregoing available PRACH resource according to an actual location of the UE. That is, the processing module 20 of the UE may determine, according to the information that is about the PRACH resource and that is carried in the foregoing notification message, the location of the available PRACH resource, that is, the location of the available PRACH resource in the current location of the UE. After the UE determines the location of the specific available PRACH resource by using the processing module 20, the sending module 30 may send the random access code to the base station at the location of the foregoing PRACH resource, where the foregoing random access code is the random access code carried in the notification message. In specific implementation, for a specific implementation process in which the foregoing receiving module receives the notification message sent by the base station, refer to step S101 in a first embodiment of a random access method provided in an embodiment of the present invention, and details are not described herein again.

In some feasible implementation manners, after the sending module 30 of the UE sends the random access code to the base station, the receiving module 10 may receive, in a random access response receiving window configured by the base station, the random access response message sent by the base station, where the foregoing random access response receiving window may be learned from the notification message received by the foregoing receiving module 10, that is, the notification message received by the foregoing receiving module 10 may carry the random access response receiving window configured by the base station. In specific implementation, a scheduling command corresponding to the random access response message that is sent by the base station to the UE and that is received by the receiving module 10 may be scrambled by using an RA-RNTI. Before receiving the foregoing random access response message, the receiving module 10 of the UE further needs to determine a value of the foregoing RA-RNTI. Specifically, the value of the foregoing RA-RNTI may be fixed in the protocol, or may be determined according to a time domain location and a frequency domain location that are of the PRACH resource actually used by the UE, or be determined by using the received notification message; that is, the base station may notify the UE of the value of the foregoing RA-RNTI by using the foregoing notification message, and the receiving module 10 of the UE may determine the value of the random access radio network temporary identifier RA-RNTI according to protocol pre-configuration or a time domain location and a frequency domain location that are of the PRACH resource. After determining the value of the foregoing RA-RNTI, the receiving module 10 of the UE may decode, in the random access response receiving window by using the foregoing RA-RNTI, the scheduling command corresponding to the foregoing random access response message, and decode the random access response message according to the foregoing scheduling command, so as to obtain the random access response message sent by the base station. In specific implementation, a start location of the foregoing random access response receiving window may be an $N^{th}$ subframe after the UE sends the random access code, or may be an $N^{th}$ subframe after a specified time, that is, the start location of the foregoing random access response receiving window may be fixed in the protocol as the $N^{th}$ subframe after the UE sends the random access code, and the start location of the random access response receiving window is notified to the UE by using the foregoing notification message, where N may be a non-zero natural number. In this way, no matter when the UE executes the random access procedure (sending the random access code to the base station), the random access response receiving window may start from the $N^{th}$ subframe after the UE sends the random access code, or start from the $N^{th}$ subframe after the specified time, which does not cause ambiguity, and may better implement the random access procedure on the unlicensed spectrum. In specific implementation, for a specific implementation process in which the foregoing processing module and sending module send the random access code to the base station according to the notification message sent by the base station, the foregoing processing module and receiving module receive, according to the notification message sent by the base station, the random access response message sent by the base station, refer to steps S102 to S103 in the first embodiment of the random access method provided in the embodiment of the present invention, and details are not described herein again.

The UE described in this embodiment of the present invention may receive a notification message sent by a base station, where the foregoing notification message carries a random access code used by the UE to execute a random access procedure and a PRACH resource that is configured on an unlicensed spectrum and that is used by the UE to execute the random access procedure. The UE may determine, according to the foregoing notification message, a PRACH resource used by the UE to execute the random access procedure, send the random access code to the base station on the resource, and further receive, in a random access response receiving window configured by the base station, a random access response message sent by the base station, which implements that the random access procedure is executed on the unlicensed spectrum, reduces a probability of a collision in the random access procedure on the unlicensed spectrum, and enhances user experience of the random access procedure on the unlicensed spectrum.

Figure 4:
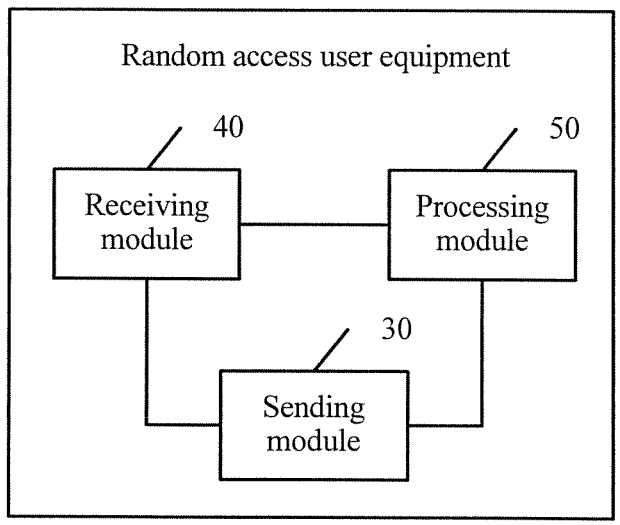
FIG. 4 is a schematic structural diagram of a second embodiment of random access user equipment according to an embodiment of the present invention.

Referring to FIG. 4, FIG. 4 is a schematic structural diagram of a second embodiment of random access user equipment according to an embodiment of the present invention. The user equipment described in this embodiment includes:

a receiving module 40, configured to receive a notification message sent by a base station, where the notification message is used to instruct the user equipment UE to execute a random access procedure, and the notification message carries at least one of the following configuration parameters: a random access code used by the UE to execute the random access procedure, or information about a physical random access channel PRACH resource that is configured on an unlicensed spectrum and that is used by the UE to execute the random access procedure;

a processing module 50, configured to determine, according to the configuration parameter in the notification message received by the receiving module, a PRACH resource used to execute the random access procedure; and a sending module 30, configured to send the random access code to the base station on the PRACH resource determined by the processing module; where the receiving module 40 is configured to receive a random access response message sent by the base station, and determine, according to the random access response message, that the random access procedure is successfully completed.

In specific implementation, because a contention and a collision may exist on an unlicensed spectrum resource, before instructing the UE to execute the random access procedure, the base station cannot determine a location of the specific available PRACH resource when the UE executes the random access procedure. Therefore, the base station cannot send the available PRACH resource to the UE by using system broadcast information, and the base station can instruct, only when the UE is required to execute the random access procedure and by using the notification message, the UE to execute the random access procedure and notify the UE of the available PRACH resource by using the notification message.

In some feasible implementation manners, when the UE is required by the base station to execute the random access procedure on the unlicensed spectrum, the base station may instruct, by sending the notification message to the UE, the UE to execute the random access procedure, and the UE may receive, by using the receiving module 40, the notification message sent by the base station. Specifically, the notification message received by the foregoing receiving module 40 may carry the random access code used by the UE to execute the random access procedure and the information about the PRACH resource that is configured on the unlicensed spectrum and that is used by the UE to execute the random access procedure. In specific implementation, the foregoing notification message may be specifically an RRC message, an MAC message, or a PHY message. Specifically, the random access code carried in the foregoing notification message may be a dedicated random access code, or may be information used to instruct the UE to randomly select a random access code. The information about the PRACH resource that is configured on the unlicensed spectrum and that is used by the foregoing UE to execute the random access procedure may include a frequency domain location of the foregoing PRACH resource, a time domain location of the foregoing PRACH resource, or the like, for example, a specific PRACH resource, or a subframe that is in a time domain and in which the PRACH resource exists. The foregoing time domain information may be an absolute frame number and an absolute subframe number, or a subframe offset (for example, a sixth subframe behind a subframe of the foregoing notification message) relative to the foregoing notification message. This embodiment of the present invention imposes no limitation on the frequency domain location or the time domain location of the PRACH resource. That is, when the base station instructs, by sending the notification message to the UE, the UE to execute the random access procedure, the UE may receive, by using the receiving module 40, the notification message sent by the base station, and learn the specific location of the available PRACH resource according to the notification message received by the receiving module 40, and may further send, to the UE, the random access code used by the UE to execute the random access. The processing module 50 of the UE may determine, according to the PRACH resource notified in the notification message received by the receiving module 40, the PRACH resource used to execute the random access procedure, and send, by using the sending module 30, the random access code to the base station on the PRACH resource determined by the foregoing processing module 50.

In some feasible implementation manners, the notification message may be sent to the UE by using a cell operating on a licensed spectrum when the base station sends the notification message used to instruct to execute the random access procedure to the UE. Specifically, the notification message may be sent to the UE by using a primary cell, or be sent to the UE by using a secondary cell. The receiving module 40 of the UE may receive the notification message sent by the base station by using the primary cell or the secondary cell, where the foregoing primary cell or secondary cell may be pre-configured in a protocol, or may be configured by using another message, which is not limited herein. In specific implementation, for a specific implementation process in which the foregoing receiving module receives the notification message sent by the base station, refer to step S201 in a first embodiment of a random access method provided in an embodiment of the present invention, and details are not described herein again.

In some feasible implementation manners, the foregoing processing module 50 is specifically configured to:

determine, according to the information that is about the PRACH resource and that is in the notification message, a location of the PRACH resource used to execute the random access procedure; and the sending module 30 is configured to send, at the determined location of the PRACH resource, the random access code carried in the notification message to the base station.

In some feasible implementation manners, the notification message received by the receiving module 40 further includes at least one of: a listening parameter that is used to listen on the unlicensed spectrum before the UE sends the random access code to the base station, or a validity time for sending the random access code by the UE, where the listening parameter includes at least one of a listening time, a backoff time, a power threshold, or an energy threshold.

The processing module 50 is further configured to:

listen to, according to the listening parameter, whether the determined PRACH resource configured on the unlicensed spectrum is idle, or listen to, according to the listening parameter, whether the determined unlicensed spectrum is idle; and if it is detected, by means of listening, that the PRACH resource is idle or the unlicensed spectrum is idle, instruct the sending module 30 to send the random access code to the base station on the PRACH resource during the validity time for sending the random access code, or instruct the sending module 30 to send the random access code to the base station on the PRACH resource during the validity time for sending the random access code and after backoff is randomly performed for a specified time according to the backoff time.

In some feasible implementation manners, after the receiving module 40 of the UE receives the notification message sent by the base station, the processing module 50 may determine, according to the configuration parameter carried in the notification message received by the receiving module 40, the PRACH resource used to execute the random access procedure. Specifically, the configuration parameter carried in the notification message received by the foregoing receiving module 40 may include the random access code used by the foregoing UE to execute the random access procedure, the PRACH resource used by the foregoing UE to execute the random access procedure, and the like; the PRACH resource carried in the foregoing notification message is the PRACH resource that is configured on the unlicensed spectrum and that is obtained by the base station, and is the available PRACH resource determined by the base station. However, because of an inconsistency between a location of the base station and a location of the UE, the UE may be in a moving state. Therefore, after the base station determines the available PRACH resource and notifies the UE of the available PRACH resource by using the notification message, if the UE is in the moving state, the PRACH resource sent by the foregoing base station may be unavailable in a current location of the UE when the UE executes the random access procedure according to the notification message sent by the base station; after the UE receives, by using the receiving module 40, the notification message sent by the base station and obtains the available PRACH resource, the processing module 50 may further determine a location of a specific to-be-used PRACH resource in the foregoing available PRACH resource according to an actual location of the UE. Specifically, the base station may send, by using the foregoing notification message, the listening parameter that is used to listen to the PRACH resource before the UE sends the random access code to the base station to the UE when the UE executes the random access procedure. After receiving the notification message sent by the foregoing base station, the receiving module 40 of the UE may obtain, from the foregoing notification message, the listening parameter that is used to listen to the PRACH resource. The PRACH resource listened to by the foregoing UE is the PRACH resource configured on the unlicensed spectrum; that is, the UE may listen to, by using the processing module 50, the PRACH resource sent by the base station to the UE by using the notification message, and determine the specific available PRACH resource. The foregoing listening parameter may include the listening time, the backoff time, the power threshold, the energy threshold, and the like. In specific implementation, the notification message that is sent by the base station and that is received by the receiving module 40 of the foregoing UE may further carry the validity time for sending the random access code by the UE; that is, the sending module 30 of the UE may send the random access code to the base station on the determined available PRACH resource during the foregoing validity time. Specifically, after determining, according to the notification message sent by the base station, the PRACH resource used by the UE to execute the random access procedure, the processing module 50 of the UE may listen to the foregoing PRACH resource according to the foregoing listening parameter, that is, listen to whether the PRACH resource configured on the foregoing unlicensed spectrum is idle, or listen to, according to the listening parameter, whether the determined unlicensed spectrum is idle, and if the processing module 50 detects, by means of listening, that the PRACH resource is idle or the unlicensed spectrum is idle, the sending module 30 may send the random access code to the base station on the foregoing determined PRACH resource during the foregoing validity time for sending the random access code. In specific implementation, after the processing module 50 of the UE listens to, according to the foregoing listening parameter, the PRACH resource configured on the unlicensed spectrum and determines the available PRACH resource, the sending module 30 may further send, after the random backoff time (that is, the specified time) according to the backoff time in the foregoing listening parameter, the random access code to the base station on the foregoing available PRACH resource, where the foregoing random access code is the random access code carried in the notification message.

In some feasible implementation manners, the foregoing receiving module 40 is specifically configured to:

determine a value of a random access radio network temporary identifier RA-RNTI according to protocol pre-configuration or a time domain location and a frequency domain location that are of the PRACH resource; and decode, by using the RA-RNTI in a random access response receiving window, a scheduling command corresponding to the random access response message, and decode the random access response message according to the scheduling command.

In some feasible implementation manners, after the sending module 30 of the UE sends the random access code to the base station, the receiving module 40 may receive, in the random access response receiving window configured by the base station, the random access response message sent by the base station, where the foregoing random access response receiving window may be learned from the notification message received by the receiving module 40, that is, the notification message that is sent by the base station to the UE and that is received by the foregoing receiving module 40 may carry the random access response receiving window configured by the base station. In specific implementation, the scheduling command corresponding to the random access response message sent by the base station to the UE may be scrambled by using the RA-RNTI. Before receiving the foregoing random access response message, the receiving module 40 of the UE further needs to determine the value of the foregoing RA-RNTI. Specifically, the value of the foregoing RA-RNTI may be fixed in the protocol, or may be determined according to a time domain location and a frequency domain location that are of the PRACH resource actually used by the UE, or be determined by using the notification message sent by the base station; that is, the base station may notify the UE of the value of the foregoing RA-RNTI by using the foregoing notification message, and after receiving the notification message sent by the base station, the receiving module 40 of the UE may determine the value of the random access radio network temporary identifier RA-RNTI according to the protocol pre-configuration or a time domain location and a frequency domain location that are of the PRACH resource. After determining the value of the foregoing RA-RNTI, the receiving module 40 of the UE may decode, in the random access response receiving window by using the foregoing RA-RNTI, the scheduling command corresponding to the foregoing random access response message, and decode the random access response message according to the foregoing scheduling command, so as to obtain the random access response message sent by the base station. In specific implementation, a start location of the foregoing random access response receiving window may be an $N^{th}$ subframe after the UE sends the random access code, or may be an $N^{th}$ subframe after the specified time, that is, the start location of the foregoing random access response receiving window may be fixed in the protocol as the $N^{th}$ subframe after the UE sends the random access code, and the start location of the random access response receiving window is notified to the UE by using the foregoing notification message, where N may be a non-zero natural number. In this way, no matter when the UE executes the random access procedure (sending the random access code to the base station), the random access response receiving window may start from the $N^{th}$ subframe after the UE sends the random access code, or start from the $N^{th}$ subframe after the specified time, which does not cause ambiguity, and may better implement the random access procedure on the unlicensed spectrum. In specific implementation, for a specific implementation process in which the foregoing processing module and sending module send the random access code to the base station according to the notification message sent by the base station, the foregoing processing module and receiving module receive, according to the notification message sent by the base station, the random access response message sent by the base station, refer to steps S202 to S205 in the first embodiment of the random access method provided in the embodiment of the present invention, and details are not described herein again.

The UE described in this embodiment of the present invention may receive a notification message sent by a base station, where the foregoing notification message carries a random access code used by the UE to execute a random access procedure and a PRACH resource that is configured on an unlicensed spectrum and that is used by the UE to execute the random access procedure. The UE may listen to, according to a listening parameter that is set in the notification message, the PRACH resource that is configured on the unlicensed spectrum and that is sent by the base station, determine, according to the foregoing notification message, a PRACH resource used by the UE to execute the random access procedure, send the random access code to the base station on the resource, and further receive, in a random access response receiving window configured by the base station, a random access response message sent by the base station, which implements that the random access procedure is executed on the unlicensed spectrum, reduces a probability of a collision in the random access procedure on the unlicensed spectrum, and enhances user experience of the random access procedure on the unlicensed spectrum.

Figure 5:
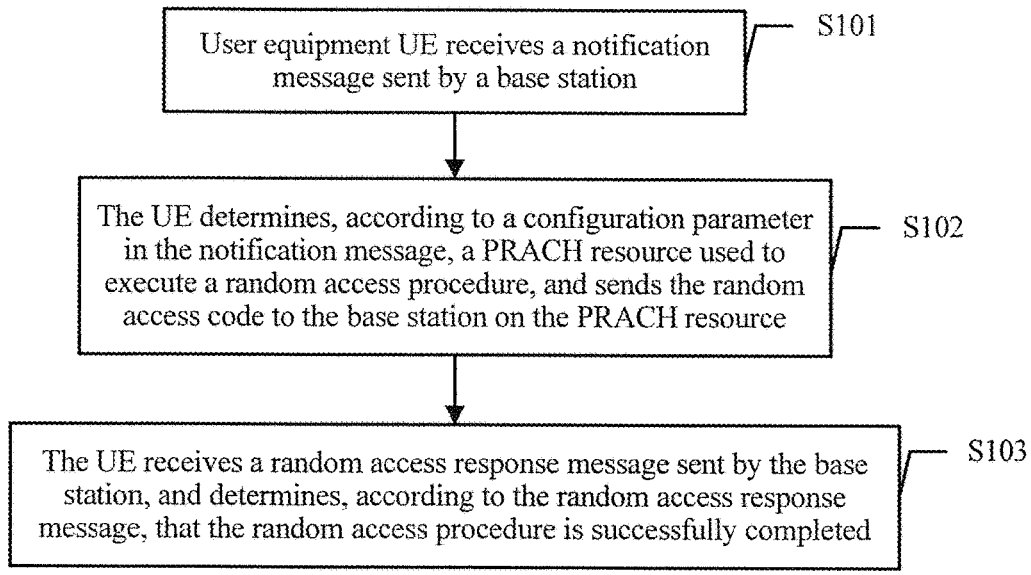
FIG. 5 is a schematic flowchart of a first embodiment of a random access method according to an embodiment of the present invention.

Referring to FIG. 5, FIG. 5 is a schematic flowchart of a first embodiment of a random access method according to an embodiment of the present invention. The random access method described in this embodiment includes the following steps:

S101. User equipment UE receives a notification message sent by a base station.

In specific implementation, because a contention and a collision may exist on an unlicensed spectrum resource, before instructing the UE to execute a random access procedure, the base station cannot determine a location of a specific available PRACH resource when the UE executes the random access procedure. Therefore, the base station cannot send the available PRACH resource to the UE by using system broadcast information, and the base station can instruct, only when the UE is required to execute the random access procedure and by using the notification message, the UE to execute the random access procedure and notify the UE of the available PRACH resource by using the notification message.

In some feasible implementation manners, when the UE is required by the base station to execute the random access procedure on an unlicensed spectrum, the base station may instruct, by sending the notification message to the UE, the UE to execute the random access procedure, and the UE may receive the notification message sent by the base station, and execute the random access procedure according to the foregoing notification message. Specifically, the foregoing notification message may carry a random access code used by the UE to execute the random access procedure or information about a PRACH resource that is configured on the unlicensed spectrum and that is used by the UE to execute the random access procedure. In specific implementation, the foregoing notification message may be specifically a radio resource control (Radio Resource Control, RRC) message, a media access control (Media Access Control, MAC) message, or a physical layer (Physical Layer, PHY) message. Specifically, the random access code carried in the foregoing notification message may be a dedicated random access code, or may be information used to instruct the UE to randomly select a random access code. The information about the PRACH resource that is configured on the unlicensed spectrum and that is used by the foregoing UE to execute the random access procedure may include a frequency domain location of the foregoing PRACH resource, a time domain location of the foregoing PRACH resource, or the like, for example, a specific PRACH resource, or a subframe that is in a time domain and in which the PRACH resource exists. The foregoing time domain information may be an absolute frame number and an absolute subframe number, or a subframe offset (for example, a sixth subframe behind a subframe of the foregoing notification message) relative to the foregoing notification message. This embodiment of the present invention imposes no limitation on the frequency domain location or the time domain location of the PRACH resource. That is, when instructing, by sending the notification message to the UE, the UE to execute the random access procedure, the base station may notify the UE of an obtained specific location of the available PRACH resource, and may further send, to the UE, the random access code used by the UE to execute the random access. The UE may determine, according to the PRACH resource notified in the notification message, a PRACH resource used to execute the random access procedure, and send the random access code to the base station on the foregoing determined PRACH resource.

In some feasible implementation manners, the notification message may be sent to the UE by using a cell operating on a licensed spectrum when the base station sends the notification message used to instruct to execute the random access procedure to the UE. Specifically, the notification message may be sent to the UE by using a primary cell, or be sent to the UE by using a secondary cell. The UE may obtain, by using the foregoing primary cell or secondary cell, the notification message sent by the base station, where the foregoing primary cell or secondary cell may be pre-configured in a protocol, or may be configured by using another message, which is not limited herein.

S102. The UE determines, according to a configuration parameter in the notification message, a PRACH resource used to execute a random access procedure, and sends a random access code to the base station on the PRACH resource.

S103. The UE receives a random access response message sent by the base station, and determines, according to the random access response message, that the random access procedure is successfully completed.

In some feasible implementation manners, after receiving the notification message sent by the base station, the UE may determine, according to the configuration parameter carried in the notification message, the PRACH resource used to execute the random access procedure. Specifically, the configuration parameter carried in the foregoing notification message may include the random access code used by the foregoing UE to execute the random access procedure, the PRACH resource used by the foregoing UE to execute the random access procedure, and the like; the PRACH resource carried in the foregoing notification message is the PRACH resource that is configured on the unlicensed spectrum and that is obtained by the base station, and is the available PRACH resource determined by the base station. However, because of an inconsistency between a location of the base station and a location of the UE, the UE may be in a moving state. Therefore, after the base station determines the available PRACH resource and notifies the UE of the available PRACH resource by using the notification message, if the UE is in the moving state, the PRACH resource sent by the foregoing base station may be unavailable in a current location of the UE when the UE executes the random access procedure according to the notification message sent by the base station; after receiving the notification message sent by the base station and obtaining the available PRACH resource, the UE may further determine a location of a specific to-be-used PRACH resource in the foregoing available PRACH resource according to an actual location of the UE. That is, the UE may determine, according to the information that is about the PRACH resource and that is carried in the foregoing notification message, the location of the available PRACH resource, that is, the location of the available PRACH resource in the current location of the UE. After determining the location of the specific available PRACH resource, the UE may send the random access code to the base station at the location of the foregoing PRACH resource, where the foregoing random access code is the random access code carried in the notification message.

In some feasible implementation manners, after sending the random access code to the base station, the UE may receive, in a random access response receiving window configured by the base station, the random access response message sent by the base station, where the foregoing random access response receiving window may be notified to the UE by using the notification message sent to the UE, that is, the notification message sent by the foregoing base station to the UE may carry the random access response receiving window configured by the base station. In specific implementation, a scheduling command corresponding to the random access response message sent by the base station to the UE may be scrambled by using a random access radio network temporary identifier (RA-RNTI). Before receiving the foregoing random access response message, the UE further needs to determine a value of the foregoing RA- RNTI. Specifically, the value of the foregoing RA-RNTI may be fixed in the protocol, or may be determined according to a time domain location and a frequency domain location that are of the PRACH resource actually used by the UE, or be determined by using the notification message sent by the base station; that is, the base station may notify the UE of the value of the foregoing RA-RNTI by using the foregoing notification message, and the UE may determine the value of the random access radio network temporary identifier RA-RNTI according to protocol pre-configuration or a time domain location and a frequency domain location that are of the PRACH resource. After determining the value of the foregoing RA-RNTI, the UE may decode, in the random access response receiving window by using the foregoing RA-RNTI, the scheduling command corresponding to the foregoing random access response message, and decode the random access response message according to the foregoing scheduling command, so as to obtain the random access response message sent by the base station. In specific implementation, a start location of the foregoing random access response receiving window may be an $N^{th}$ subframe after the UE sends the random access code, or may be an $N^{th}$ subframe after a specified time, that is, the start location of the foregoing random access response receiving window may be fixed in the protocol as the $N^{th}$ subframe after the UE sends the random access code, and the start location of the random access response receiving window is notified to the UE by using the foregoing notification message, where N may be a non-zero natural number. In this way, no matter when the UE executes the random access procedure (sending the random access code to the base station), the random access response receiving window may start from the $N^{th}$ subframe after the UE sends the random access code, or start from the $N^{th}$ subframe after the specified time, which does not cause ambiguity, and may better implement the random access procedure on the unlicensed spectrum.

In this embodiment of the present invention, the UE may receive a notification message sent by a base station, where the foregoing notification message carries a random access code used by the UE to execute a random access procedure and a PRACH resource that is configured on an unlicensed spectrum and that is used by the UE to execute the random access procedure. The UE may determine, according to the foregoing notification message, a PRACH resource used by the UE to execute the random access procedure, send the random access code to the base station on the resource, and further receive, in a random access response receiving window configured by the base station, a random access response message sent by the base station, which implements that the random access procedure is executed on the unlicensed spectrum, reduces a probability of a collision in the random access procedure on the unlicensed spectrum, and enhances user experience of the random access procedure on the unlicensed spectrum.

Figure 6:
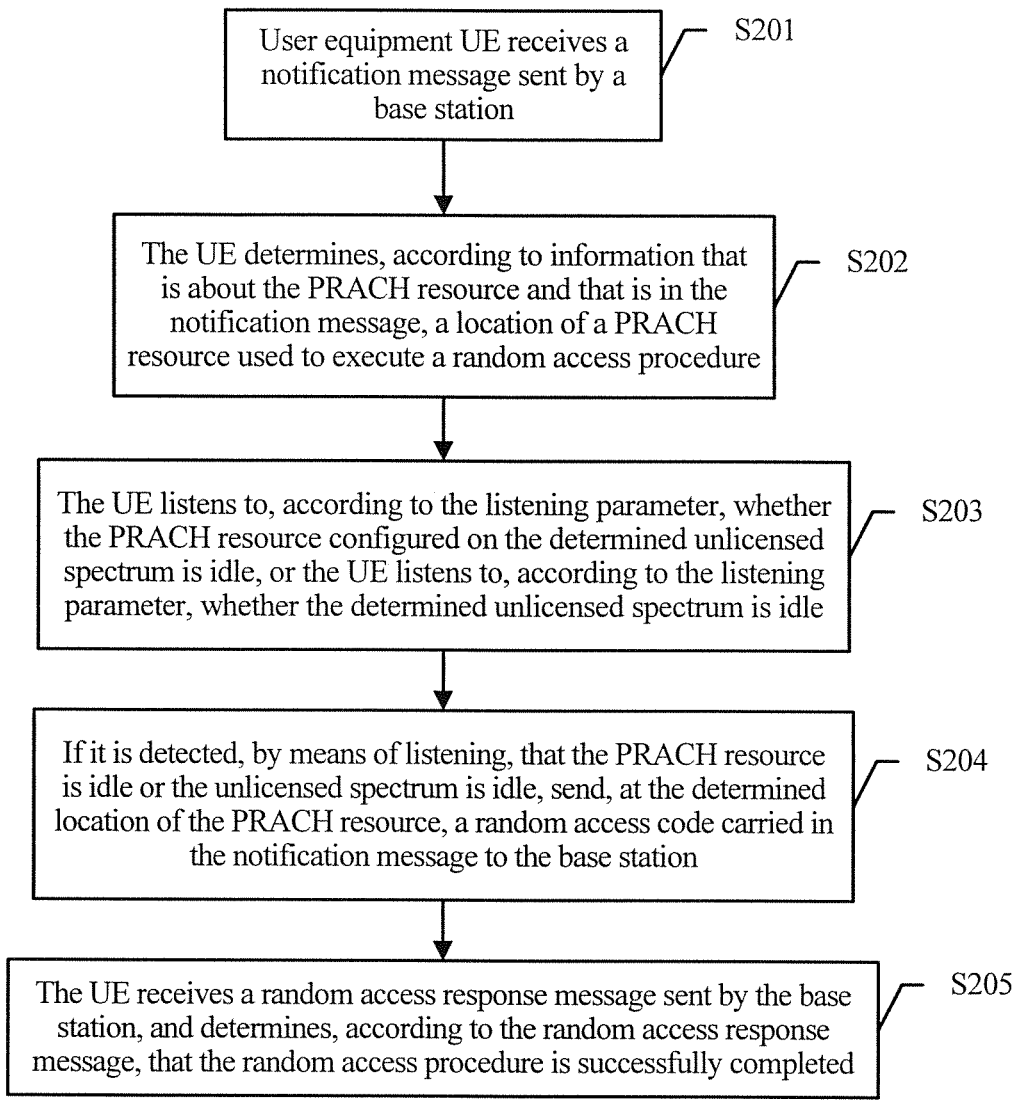
FIG. 6 is a schematic flowchart of a second embodiment of a random access method according to an embodiment of the present invention.

Referring to FIG. 6, FIG. 6 is a schematic flowchart of a second embodiment of a random access method according to an embodiment of the present invention. The random access method described in this embodiment includes the following steps:

S201. User equipment UE receives a notification message sent by a base station.

In specific implementation, because a contention and a collision may exist on an unlicensed spectrum resource, before instructing the UE to execute a random access procedure, the base station cannot determine a location of a specific available PRACH resource when the UE executes the random access procedure. Therefore, the base station cannot send the available PRACH resource to the UE by using system broadcast information, and the base station can instruct, only when the UE is required to execute the random access procedure and by using the notification message, the UE to execute the random access procedure and notify the UE of the available PRACH resource by using the notification message.

In some feasible implementation manners, when the UE is required by the base station to execute the random access procedure on an unlicensed spectrum, the base station may instruct, by sending the notification message to the UE, the UE to execute the random access procedure, and the UE may receive the notification message sent by the base station, and execute the random access procedure according to the foregoing notification message. Specifically, the foregoing notification message may carry a random access code used by the UE to execute the random access procedure or information about a PRACH resource that is configured on the unlicensed spectrum and that is used by the UE to execute the random access procedure. In specific implementation, the foregoing notification message may be specifically an RRC message, an MAC message, or a PHY message. Specifically, the random access code carried in the foregoing notification message may be a dedicated random access code, or may be information used to instruct the UE to randomly select a random access code. The information about the PRACH resource that is configured on the unlicensed spectrum and that is used by the foregoing UE to execute the random access procedure may include a frequency domain location of the foregoing PRACH resource, a time domain location of the foregoing PRACH resource, or the like, for example, a specific PRACH resource, or a subframe that is in a time domain and in which the PRACH resource exists. The foregoing time domain information may be an absolute frame number and an absolute subframe number, or a subframe offset (for example, a sixth subframe behind a subframe of the foregoing notification message) relative to the foregoing notification message. This embodiment of the present invention imposes no limitation on the frequency domain location or the time domain location of the PRACH resource. That is, when instructing, by sending the notification message to the UE, the UE to execute the random access procedure, the base station may notify the UE of an obtained specific location of the available PRACH resource, and may further send, to the UE, the random access code used by the UE to execute the random access. The UE may determine, according to the PRACH resource notified in the notification message, a PRACH resource used to execute the random access procedure, and send the random access code to the base station on the foregoing determined PRACH resource.

In some feasible implementation manners, the notification message may be sent to the UE by using a cell operating on a licensed spectrum when the base station sends the notification message used to instruct to execute the random access procedure to the UE. Specifically, the notification message may be sent to the UE by using a primary cell, or be sent to the UE by using a secondary cell. The UE may obtain, by using the foregoing primary cell or secondary cell, the notification message sent by the base station, where the foregoing primary cell or secondary cell may be pre-configured in a protocol, or may be configured by using another message, which is not limited herein.

S202. The UE determines, according to information that is about the PRACH resource and that is in the notification message, a location of a PRACH resource used to execute a random access procedure.

S203. The UE listens to, according to the listening parameter, whether the determined PRACH resource configured on the unlicensed spectrum is idle, or the UE listens to, according to the listening parameter, whether the determined unlicensed spectrum is idle.

S204. If it is detected, by means of listening, that the PRACH resource is idle or the unlicensed spectrum is idle, send, at the determined location of the PRACH resource, a random access code carried in the notification message to the base station.

S205. The UE receives a random access response message sent by the base station, and determines, according to the random access response message, that the random access procedure is successfully completed.

In some feasible implementation manners, after receiving the notification message sent by the base station, the UE may determine, according to a configuration parameter carried in the notification message, the PRACH resource used to execute the random access procedure. Specifically, the configuration parameter carried in the foregoing notification message may include the random access code used by the foregoing UE to execute the random access procedure, the PRACH resource used by the foregoing UE to execute the random access procedure, and the like; the PRACH resource carried in the foregoing notification message is the PRACH resource that is configured on the unlicensed spectrum and that is obtained by the base station, and is the available PRACH resource determined by the base station. However, because of an inconsistency between a location of the base station and a location of the UE, the UE may be in a moving state. Therefore, after the base station determines the available PRACH resource and notifies the UE of the available PRACH resource by using the notification message, if the UE is in the moving state, the PRACH resource sent by the foregoing base station may be unavailable in a current location of the UE when the UE executes the random access procedure according to the notification message sent by the base station; after receiving the notification message sent by the base station and obtaining the available PRACH resource, the UE may further determine a location of a specific to-be-used PRACH resource in the foregoing available PRACH resource according to an actual location of the UE. Specifically, the base station may send, by using the foregoing notification message, the listening parameter that is used to listen to the PRACH resource before the UE sends the random access code to the base station to the UE when the UE executes the random access procedure. The PRACH resource listened to by the foregoing UE is the PRACH resource configured on the unlicensed spectrum; that is, the UE may listen to the PRACH resource sent by the base station to the UE by using the notification message, and determine the specific available PRACH resource. The foregoing listening parameter may include a listening time, a backoff time, a power threshold, an energy threshold, and the like. In specific implementation, the notification message sent by the base station to the UE may further carry a validity time for sending the random access code by the UE; that is, the UE may send the random access code to the base station on the determined available PRACH resource during the foregoing validity time. Specifically, after determining, according to the notification message sent by the base station, the PRACH resource used by the UE to execute the random access procedure, the UE may listen to the foregoing PRACH resource according to the foregoing listening parameter, that is, listen to whether the PRACH resource configured on the foregoing unlicensed spectrum is idle, or the UE listens to, according to the listening parameter, whether the determined unlicensed spectrum is idle, and if it is detected, by means of listening, that the foregoing PRACH resource is idle or the unlicensed spectrum is idle, the UE may send the random access code to the base station on the foregoing determined PRACH resource during the foregoing validity time for sending the random access code. In specific implementation, after listening to, according to the foregoing listening parameter, the PRACH resource configured on the unlicensed spectrum and determining the available PRACH resource, the UE may further send, after a random backoff time (that is, a specified time) according to the backoff time in the foregoing listening parameter, the random access code to the base station on the foregoing available PRACH resource, where the foregoing random access code is the random access code carried in the notification message.

In some feasible implementation manners, after sending the random access code to the base station, the UE may receive, in a random access response receiving window configured by the base station, the random access response message sent by the base station, where the foregoing random access response receiving window may be notified to the UE by using the notification message sent to the UE, that is, the notification message sent by the foregoing base station to the UE may carry the random access response receiving window configured by the base station. In specific implementation, a scheduling command corresponding to the random access response message sent by the base station to the UE may be scrambled by using an RA-RNTI. Before receiving the foregoing random access response message, the UE further needs to determine a value of the foregoing RA-RNTI. Specifically, the value of the foregoing RA-RNTI may be fixed in the protocol, or may be determined according to a time domain location and a frequency domain location that are of the PRACH resource actually used by the UE, or be determined by using the notification message sent by the base station; that is, the base station may notify the UE of the value of the foregoing RA-RNTI by using the foregoing notification message, and the UE may determine the value of the random access radio network temporary identifier RA-RNTI according to protocol pre-configuration or a time domain location and a frequency domain location that are of the PRACH resource. After determining the value of the foregoing RA-RNTI, the UE may decode, in the random access response receiving window by using the foregoing RA-RNTI, the scheduling command corresponding to the foregoing random access response message, and decode the random access response message according to the foregoing scheduling command, so as to obtain the random access response message sent by the base station. In specific implementation, a start location of the foregoing random access response receiving window may be an $N^{th}$ subframe after the UE sends the random access code, or may be an $N^{th}$ subframe after the specified time, that is, the start location of the foregoing random access response receiving window may be fixed in the protocol as the $N^{th}$ subframe after the UE sends the random access code, and the start location of the random access response receiving window is notified to the UE by using the foregoing notification message, where N may be a non-zero natural number. In this way, no matter when the UE executes the random access procedure (sending the random access code to the base station), the random access response receiving window may start from the $N^{th}$ subframe after the UE sends the random access code, or start from the $N^{th}$ subframe after the specified time, which does not cause ambiguity, and may better implement the random access procedure on the unlicensed spectrum.

In this embodiment of the present invention, the UE may receive a notification message sent by a base station, where the foregoing notification message carries a random access code used by the UE to execute a random access procedure and a PRACH resource that is configured on an unlicensed spectrum and that is used by the UE to execute the random access procedure. The UE may listen to, according to a listening parameter that is set in the notification message, the PRACH resource that is configured on the unlicensed spectrum and that is sent by the base station, determine, according to the foregoing notification message, a PRACH resource used by the UE to execute the random access procedure, send the random access code to the base station on the resource, and further receive, in a random access response receiving window configured by the base station, a random access response message sent by the base station, which implements that the random access procedure is executed on the unlicensed spectrum, reduces a probability of a collision in the random access procedure on the unlicensed spectrum, and enhances user experience of the random access procedure on the unlicensed spectrum.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. Random access user equipment, comprising:
a receiving module, configured to receive a notification message sent by a base station, wherein the notification message is used to instruct the user equipment (UE) to execute a random access procedure, and the notification message carries at least one of the following configuration parameters:
a random access code used by the UE to execute the random access procedure; or
information about a physical random access channel (PRACH) resource that is configured on an unlicensed spectrum and that is used by the UE to execute the random access procedure;
a processing module, configured to determine, according to the configuration parameter in the notification message received by the receiving module, a PRACH resource used to execute the random access procedure; and
a sending module, configured to send the random access code to the base station on the PRACH resource determined by the processing module; wherein
the receiving module is configured to receive a random access response message sent by the base station, and determine, according to the random access response message, that the random access procedure is successfully completed.

2. The user equipment according to claim 1, wherein the notification message received by the receiving module comprises a radio resource control (RRC) message, a media access control (MAC) message, or a physical layer (PHY) message.

3. The user equipment according to claim 1, wherein the random access code that is used by the UE to execute the random access procedure and that is carried in the notification message received by the receiving module comprises:
a dedicated random access code; or
information used to instruct the UE to randomly select a random access code.

4. The user equipment according to claim 1, wherein the information that is about the PRACH resource and that is carried in the notification message received by the receiving module comprises:
a frequency domain location of the PRACH resource or a time domain location of the PRACH resource, wherein the PRACH resource is configured on the unlicensed spectrum and is used by the UE to execute the random access procedure.

5. The user equipment according to claim 1, wherein when determining, according to the configuration parameter in the notification message, the PRACH resource used to execute the random access procedure, the processing module is configured to:
determine, according to the information that is about the PRACH resource and that is in the notification message, a location of the PRACH resource used to execute the random access procedure; and
the sending module is configured to send, at the determined location of the PRACH resource, the random access code carried in the notification message to the base station.

6. The user equipment according to claim 1, wherein the notification message received by the receiving module further comprises:
at least one of a listening parameter that is used to listen on the unlicensed spectrum before the UE sends the random access code to the base station, or a validity time for sending the random access code by the UE, wherein
the listening parameter comprises at least one of a listening time, a backoff time, a power threshold, or an energy threshold.

7. The user equipment according to claim 6, wherein the processing module is further configured to:
listen to, according to the listening parameter, whether the determined PRACH resource configured on the unlicensed spectrum is idle, or listen to, according to the listening parameter, whether the unlicensed spectrum is idle; and
when it is detected, by listening, that the PRACH resource is idle or the unlicensed spectrum is idle, instruct the sending module to send the random access code to the base station on the PRACH resource during the validity time for sending the random access code, or instruct the sending module to send the random access code to the base station on the PRACH resource during the validity time for sending the random access code and after backoff is randomly performed for a specified time according to the backoff time.

8. The user equipment according to claim 7, wherein the receiving module is configured to:

determine a value of a random access radio network temporary identifier (RA-RNTI) according to protocol pre-configuration or a time domain location and a frequency domain location that are of the PRACH resource; and decode, by using the RA-RNTI in a random access response receiving window, a scheduling command corresponding to the random access response message, and decode the random access response message according to the scheduling command.

9. The user equipment according to claim 8, wherein a start location of the random access response receiving window comprises an $N^{th}$ subframe after the UE sends the random access code; or a start location of the random access response receiving window comprises an $N^{th}$ subframe after the specified validity time;

wherein N is a non-zero natural number.

10. A random access method, the method comprising:

receiving, by user equipment (UE), a notification message sent by abase station, wherein the notification message is used to instruct the UE to execute a random access procedure, and the notification message carries at least one of the following configuration parameters:

a random access code used by the UE to execute the random access procedure; or information about a physical random access channel PRACH resource that is configured on an unlicensed spectrum and that is used by the UE to execute the random access procedure;

determining, by the UE according to the configuration parameter in the notification message, a PRACH resource used to execute the random access procedure, and sending the random access code to the base station on the PRACH resource; and receiving, by the UE, a random access response message sent by the base station, and determining, according to the random access response message, that the random access procedure is successfully completed.

11. The method according to claim 10, wherein the notification message comprises a radio resource control (RRC) message, a media access control (MAC) message, or a physical layer (PHY) message.

12. The method according to claim 10, wherein the random access code used by the UE to execute the random access procedure comprises:

a dedicated random access code; or information used to instruct the UE to randomly select a random access code.

13. The method according to claim 10, wherein the information about the PRACH resource that is configured on the unlicensed spectrum and that is used by the UE to execute the random access procedure comprises a frequency domain location of the PRACH resource or a time domain location of the PRACH resource.

14. The method according to claim 10, wherein determining the PRACH resource used to execute the random access procedure, and sending the random access code to the base station on the PRACH resource comprises:

determining, by the UE according to the information that is about the PRACH resource and that is in the notification message, a location of the PRACH resource used to execute the random access procedure, and sending, at the determined location of the PRACH resource, the random access code carried in the notification message to the base station.

15. The method according to claim 10, wherein the notification message further comprises:

at least one of a listening parameter that is used to listen on the unlicensed spectrum before the UE sends the random access code to the base station, or a validity time for sending the random access code by the UE, wherein the listening parameter comprises at least one of a listening time, a backoff time, a power threshold, or an energy threshold.

16. The method according to claim 15, wherein before sending the random access code to the base station on the PRACH resource, the method further comprises:

listening to, by the UE according to the listening parameter, whether the determined PRACH resource configured on the unlicensed spectrum is idle, or listening to, by the UE according to the listening parameter, whether the determined unlicensed spectrum is idle; and when it is detected, by listening, that the PRACH resource is idle or the unlicensed spectrum is idle, sending the random access code to the base station on the PRACH resource during the validity time for sending the random access code, or sending the random access code to the base station on the PRACH resource during the validity time for sending the random access code and after backoff is randomly performed for a specified time according to the backoff time.

17. The method according to claim 16, wherein receiving, by the UE, the random access response message sent by the base station comprises:

determining, by the UE, a value of a random access radio network temporary identifier (RA-RNTI) according to protocol pre-configuration or a time domain location and a frequency domain location that are of the PRACH resource; and decoding, by the UE by using the RA-RNTI in a random access response receiving window, a scheduling command corresponding to the random access response message, and decoding the random access response message according to the scheduling command.

18. The method according to claim 17, wherein a start location of the random access response receiving window comprises an $N^{th}$ subframe after the UE sends the random access code; or a start location of the random access response receiving window comprises an $N^{th}$ subframe after the specified validity time;

wherein N is a non-zero natural number.

* * * * *